Aug. 17, 1965　　　S. BLANCHI ETAL　　　3,201,729
ELECTROMAGNETIC DEVICE WITH POTTED COIL
Filed Feb. 26, 1960　　　　　　　　　　　3 Sheets-Sheet 1

Serge Blanchi
Roger Lacour
*INVENTOR.*

BY　*Carl F. Ross*

*AGENT.*

Aug. 17, 1965    S. BLANCHI ETAL    3,201,729
ELECTROMAGNETIC DEVICE WITH POTTED COIL
Filed Feb. 26, 1960    3 Sheets-Sheet 2

Serge Blanchi
Roger Lacour
*INVENTOR.*

BY *Karl F. Ross*

AGENT.

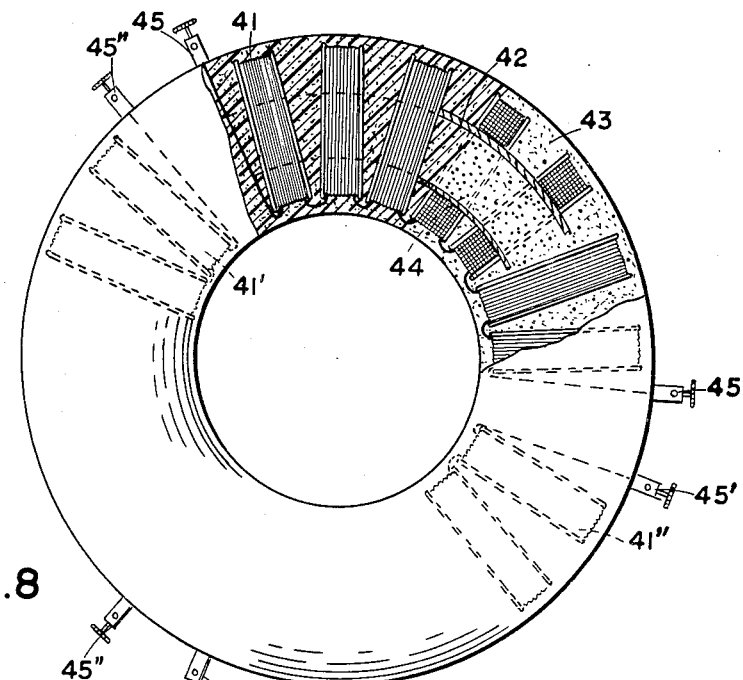
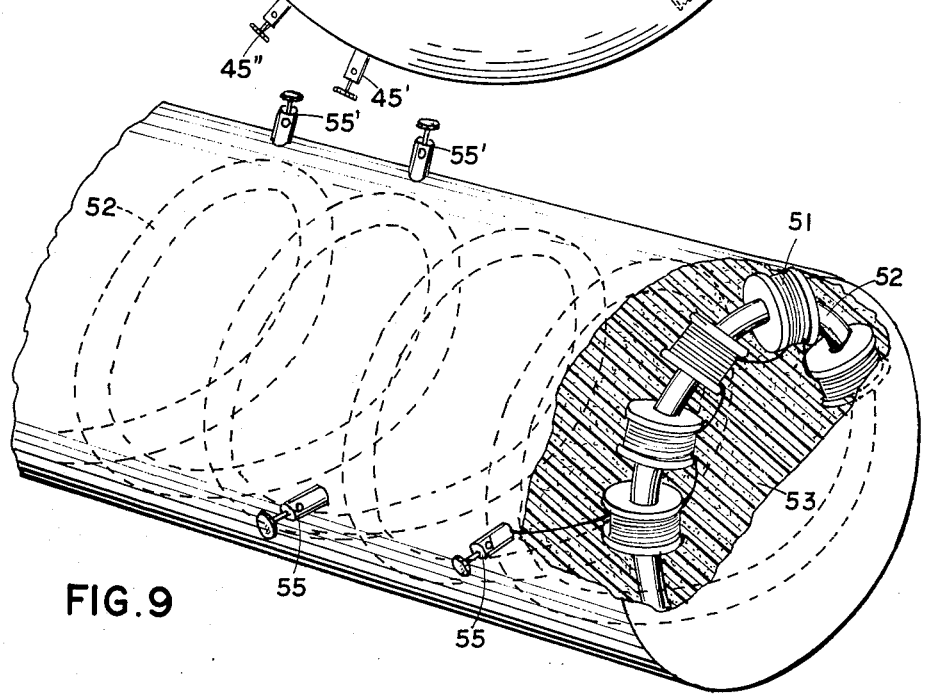

United States Patent Office 3,201,729
Patented Aug. 17, 1965

3,201,729
ELECTROMAGNETIC DEVICE WITH POTTED COIL
Serge Blanchi, 48 Ave. Alfred de Musset, Le Vesinet, France, and Roger Lacour, 86 Rue Myrrha, Paris, France
Filed Feb. 26, 1960, Ser. No. 11,272
3 Claims. (Cl. 336—83)

Our present invention relates to electromagnetic devices in which an electric circuit element such as a coil, having two or more terminals for connecting it in an external circuit, is provided with one or more ferromagnetic members defining a closed or nearly closed path of high permeability for the magnetic flux. Devices of this type include, but are not limited to, induction coils, relays, transformers and the stator and rotor portions of electric motors and generators.

It is known to form the cores of electromagnetic coils from compacted comminuted materials of high magnetic permeability, such as ferrites, which are substantially non-conductive electrically to minimize the flow of eddy currents in high-frequency applications. The present invention has for its object the utilization of such materials to simplify the manufacture and the structure of devices of the aforementioned class, irrespective of the type of current (direct, low-frequency or high-frequency) to be generated or employed in a device of this kind.

In accordance with our present invention we embed all except the terminals of one or more coils, constituting the inductive element of an electromagnetic device, in a substantially non-conductive moldable mass of numerous particles of high permeability held together by a suitable (preferably insulating) binder, this mass permeating the interior of the coil and being outwardly shaped into a mechanical support for the terminals and, if desired, for other external elements such as, for example, relay armatures and contact springs. Thus, the ferromagnetic mass may be molded in close contact with an insulating terminal base so as positively to interlock therewith upon hardening; also, the body constituted by this mass may be shaped with integral lugs or other formations to which the external elements may be conveniently secured.

We have found that the intimate association between the coil and the ferromagnetic body of an electromagnetic device embodying the invention, obtained in the aforedescribed manner, considerably increases the efficiency of the device and correspondingly reduces its bulk and weight for a given rating.

The ferromagnetic body is formed by suspending comminuted solid particles of a material having high magnetic susceptibility such as iron and similar ferromagnetic elements and compounds, including solid solutions of metal oxides (e.g. ferrites), in a suitable vehicle, preferably a non-conductor. The vehicle may comprise a highly volatile component which, upon evaporation, leaves a lattice of magnetically permeable material; a hardenable compound (e.g. paraffin or a chlorinated wax) adapted to form upon curing a solid or semi-solid carrier wherein the magnetically permeable particles remain suspended; a thixotropic material, such as a polyamide resin in an alkyd vehicle, acting similarly upon setting; or a liquid (e.g. chlorinated naphthalene) in which the magnetically permeable material is maintained in suspension bu suitable agitation.

The particles of magnetically permeable material, which should be sufficiently small to penetrate completely the spaces in and around the coil (including its inter-turn spaces, if any) to improve the efficiency of the device, are settled to any desired degree by the use of mechanical vibration or magnetic oscillations to achieve suitable particle densities. Furthermore, the particles may be oriented by the application of a magnetic field while the vehicle in which the particles are suspended is still in a liquid or a semi-solid state. Upon solidification of the substance surrounding the coil, the particles are rigidly fixed in their oriented positions.

According to still another feature of the invention, the particles, whose average diameter may range between 5 and 20 microns, are suspended in a preferably organic, non-conductive vehicle in the liquid state. The non-conductive vehicle, which may be a thermosetting or thermoplastic resin, serves to insulate the particles from each other electrically. The coil may thus be "potted" in a resin of this type for protection from physical impact and to avoid the hazard of electrical shocks to maintenance personnel. Thermosetting resins suitable for the present invention include epoxy resins and polyesters polymerized in situ and introduced, generally, with a hardening agent or catalyst.

The above and other objects, features and advantages of the present invention will become more readily apparent from the following description, reference being made to the accompanying drawing in which:

FIG. 8 is a front-elevational view, partially in section, of a toroidal magnetic-amplifier structure embodying the invention; and FIG. 9 is a perspective view, with parts broken away, of a helical structure representing a modification of the magnetic amplifier of FIG. 8.

Figure 1:
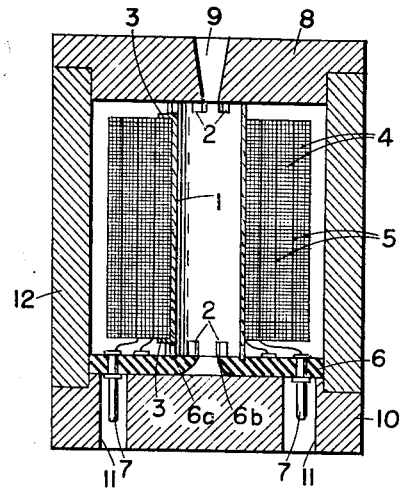
FIG. 1 is an axial cross-sectional view of a mold for casting a transformer embodying the invention.

In FIG. 1 we show a tube 1 of ferromagnetic material (e.g. sheet iron) which serves as a mandrel for several primary and secondary transformer coils 4, these coils being concentrically wound upon the mandrel and insulated from one another by a non-conductive intervening layer 5, e.g. of oiled parchment paper. Spaced angularly at both ends of the tube 1 are channels 2, formed by bending flaps 3 outwardly, which serve to establish communication between the inner cavity of the shell and the surrounding regions. Flaps 3 serve to position the coils 4 axially along the mandrel and in the mold in which the coil assembly is placed. The mold consists of a lower member 10, sides 12 and a top 8, co-operating to form a container completely enclosing the coil assembly. The latter further comprises a transformer base 6, of a non-conductive material such as fiber-board sheet, carrying the contact pins 7 of the transformer. The leads of coils 4, which are preferably wound from enameled copper wire, terminate in the pins 7. The transformer base 6 is provided with an annular groove 6a in which the lower edge of the tube 1 is seated, and with an inwardly tapering aperture 6b opening into the inner cavity of the tube. The lower member 10 of the mold is provided with holes 11 receiving the pins 7.

The top 8 is provided with a port 9 for injecting the magnetically permeable substance into the mold. This substance comprises a ferromagnetic material preferably comminuted to a particle size of 5 to 20 microns and admixed with a suitable liquid vehicle. The vehicle may be a thermoplastic substance, liquefied by heat, or a polymerizable substance mixed with a hardener or catalyst prior to charging the mold. While the comminuted ferromagnetic material is preferably suspended in the vehicle before the charge, it is also possible to add the ferromagnetic material to a mold previously filled with the vehicle.

Figure 2:
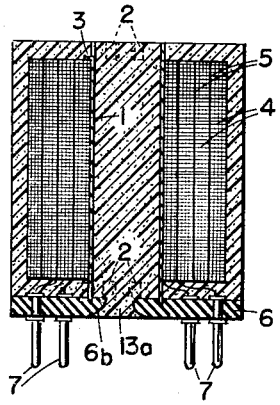
FIG. 2 is a view similar to FIG. 1, showing the completed transformer removed from the mold.

The liquid charge is introduced into the mold through port 9 with an injection pressure of, advantageously, 1 to 10 kg. per square centimeter to force the magnetically permeable substance into the cavity of tube 1 and thence, via channels 2, into the region surrounding the coils 4, so as to distribute itself about the latter and to penetrate throughout the mold cavity. The material also enters the aperture 6b. Upon setting, the magnetically permeable material, shown with stippled cross-sectional hatching in FIG. 2, forms a core within the coil cavity which is linked, in a magnetic circuit, via the material in channels 2 with the material surrounding and encasing the coils 4. A portion 13a of the hardenable material, setting in the aperture 6b, interlocks the base 6 with the transformer. The vehicle may be cured in a number of ways. In the case of a thermosetting resin such as an epoxy or polyester resin polymerized in situ within the mold, the resin may be cured by heating in an oven or by applying a high-frequency electric current to the coils to produce a heating effect.

A particularly suitable magnetically permeable substance may be formed according to the following example:

*Example*

80 grams of an iron powder containing 14% silicon is mixed into a vehicle comprising 18 grams of diallyl-phthalate, 1.9 grams of styrene and 0.1 gram of cyclohexanone peroxide. The magnetically permeable substance, heated to a temperature of 30° C., is introduced into the mold through port 9 while the coils 4 are maintained at a temperature of approximately 50° C. by resistive or inductive heating. The resulting transformer has been found to differ from conventional transformers of like rating by exhibiting an increase in heat dissipation of 7 to 12% due to the intimate contact of the coils 4 with the magnetically permeable material 13, a gain of 11% in the weight of copper which may be used in the same volume, and a saving in bulk amounting to 7% when compared with stripped laminated transformers and to 17% as against shielded ones.

Figure 3:
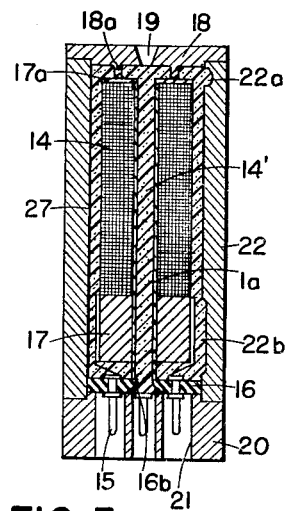
FIG. 3 is an axial cross-sectional view of a mold for producing the body of an electromagnetic relay according to the invention.
Figure 4:
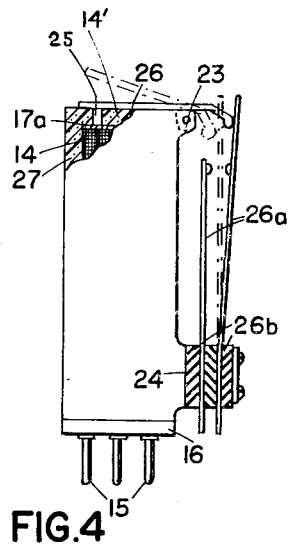
FIG. 4 is a side-elevational view, with parts broken away, of the completed relay removed from the mold.

In FIG. 3 we show a mold for forming a relay of the telephone type, comprising a lower member 20, side members 22 and an upper member 18. A coil 14 is wound about a mandrel 1a, as previously described, and positioned in the mold. The relay base 16, adapted to carry the contact pins 15 of the relay, is provided with a tapered aperture 16b adapted to interlock with the hardened magnetic material forming an inner core 14' and an outer shell 27, thus joining the base to the relay. The lower member 20 of the mold is provided with bores 21 receiving the pins 15. Coil 14 is provided with a copper ring 17, at its bottom, adapted to delay the release of the relay as is well known per set, and with a protective annular disk 17a along its top. The upper member 18, which is provided with an injection port 19, is formed with an annular shoulder 18a adapted to abut the disk 17a to isolate the upper part of core 14' from the shell 27, thereby forming an air gap 25 (FIG. 4) in the flux guide surrounding the coil 14. The magnetic material constituting this flux guide may comprise 90% by weight of a pure iron powder, 6% of a phenolic resin and 4% of a polyamide hardener for the resin. One of the side members 22 of the mold may be provided with recesses 22a, adapted to form ears 23 on the completed relay shown in FIG. 4, and 22b, adapted to form a flat boss 24 to which the switch contacts 26a, fastened between insulating blocks 26b, may be secured. The relay, upon being removed from the mold, may be provided with an armature 26 which is pivoted to the body of the relay at ears 23 and adapted to operate the contacts 26a. A magnetic field, induced in core 14' by the passage of an electric current through coil 14, serves to attract the armature 26 from its dot-dash position into its solid-line position in which it bridges the air gap 25 and, as illustrated, opens the normally closed contacts 26a.

Figure 5:
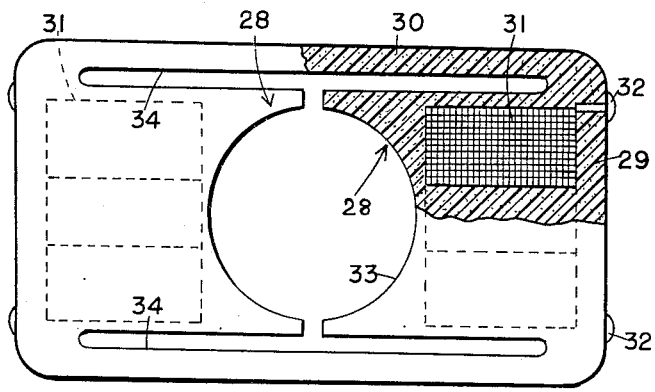
FIG. 5 is a front-elevational view, partly in section, of the field coils of a motor according to the invention.
Figure 6:
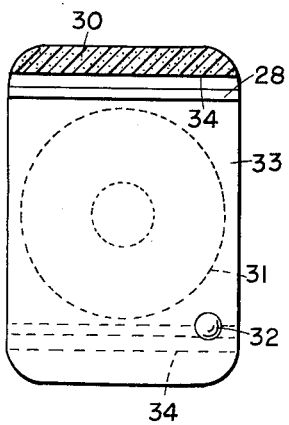
FIG. 6 is an end view of the device of FIG. 5 with part broken away.

In FIGS. 5 and 6 we show the field coils 31 of a motor, set in a mass of hardenable magnetic material. The leads of the coils 31 are connected to terminals 32, imbedded in this material. A cylindrical cavity 33, adapted to receive a motor armature for free rotation therein, is provided in the flux-guiding body during casting or by subsequent machining. Slots 34 partially surround the coils 31 and the cavity 33 to define poles 28 which concentrate the magnetic flux upon a suitable armature, for example of the type shown in FIG. 7. The magnetic circuit is completed by the outer branches 30 of magnetically permeable material which interconnect the breech portions 29 of the poles at the rear of each coil.

Figure 7:
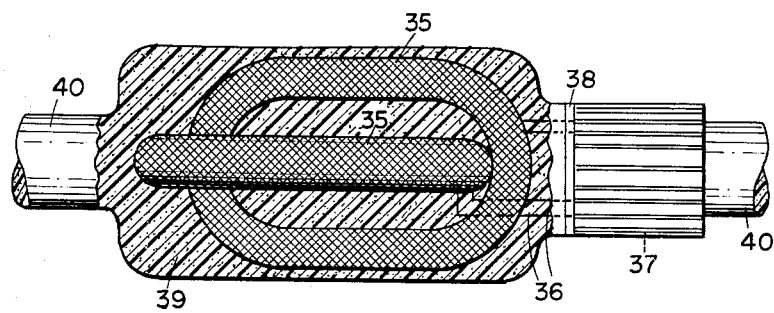
FIG. 7 is a side-elevational view, with parts broken away, of an armature for the motor of FIGS. 5 and 6.

In FIG. 7 we show an armature for the motor in which a shaft 40 and a coil-suporting body 39 are formed from a hardenable magnetically permeable material of the character described. The pre-wound coils, encased in wrappers 35 which may be of lacquered fabric preferably having sufficient resiliency to compensate for differences in thermal expansion between coil and magnetic material, are imbedded in this material, as are the commutator segments 37 which are connected to the leads 36 of the coils and constitute the terminals thereof. An insulating ring 38 abuts the commutator segments 37 on shaft 40. Generator armatures may be similarly constructed.

It will be readily apparent that other accessories not related to either the electrical or the magnetic circuit may be mechanically secured to the body of the device. In this category fall cooling fans adapted to be imbedded in the shaft 40 of the commutator armature shown in FIG. 7, pump impellers which may be cast integral with the shaft, and turbine blades serving to drive the armatures of generators. The hardened magnetic material herein described is sufficiently strong to support a load.

In FIG. 8 we show a plurality of coils 41, 41', 41" carried on a perforated flexible mandrel 42 of ferromagnetic material bent into a toroidal shape and encased in a magnetically permeable substance 43 which enters through the perforations into the inner cavity 44 of the mandrel to form the core of the toroid. If the toroid is part of a magnetic amplifier, each set of coils 41, 41' and 41" forms a respective winding whose leads are connected to corresponding terminal sets 45, 45" and 45'. Similarly, a mandrel 52, carrying spools 51, may be wound into a helical configuration and potted in the magnetically permeable material 53 as illustrated in FIG. 9. Each winding of the helical magnetic amplifier thus constituted is provided with a set of terminals 55, 55'. The helical configuration affords a more compact arrangement of magnetic amplifiers with large numbers of long windings in a comparatively small unit. The magnetic circuit is completed through the external shell portion of the cast flux guide which communicates with the core of the coils at either end thereof, and/or at intermediate perforations in the mandrel 52.

The coils of any of the structures described and shown may, if desired, be enveloped in a resilient wrapping as set forth in connection with FIG. 7.

The pole strength of the relay shown in FIG. 3 and of the field-coil body shown in FIG. 5 may be materially increased by orienting the particles magnetically before the setting of the liquid vehicle in which they are suspended. A magnetic field applied externally, or internally by electrically energizing the potted coils, may be used for this purpose. A constant magnetic field may be used to produce a core which is permanently magnetized when the ferromagnetic particles are of magnetically retentive (e.g. ceramic) material. The particles may also be settled by mechanical vibration or magnetic oscillations, e.g. to permit introduction of further particles into the liquid vehicle from without to increase the density of the magnetic mass.

The invention described and illustrated permits of many modifications and variations believed to be within the ability of persons skilled in the art, and intended to be included within the spirit and scope thereof, except as further limited by the appended claims.

We claim:

1. An electromagnetic device comprising a unitary body consisting of a non-conductive mass of a synthetic resin having a multiplicity of ferromagnetic particles distributed therein, a conductive coil imbedded in and surrounded by said mass, said coil having at least two terminal leads extending wholly within said mass, at least two terminals respectively connected with said leads and projecting from said body while being firmly mounted thereon, said mass permeating the interior of said coil and forming a core therein integral with the portion of said mass surrounding said coil, and a tube of magnetically permeable sheet material surrounding said core and separating it from said coil, said tube being provided with perforations permeated by said mass.

2. A device according to claim 1 wherein said coil is provided with a resilient wrapping within said body.

3. A device according to claim 1, further comprising a support for said terminals in contact with said body and interlockingly engaged thereby, said support being provided with an aperture tapering toward said body, said body having an integral projection received in said aperture.

References Cited by the Examiner

UNITED STATES PATENTS

| | | | |
|---|---|---|---|
| 485,284 | 11/92 | Lehman | 310—264 |
| 733,097 | 7/03 | Waterman | 336—83 X |
| 1,375,133 | 4/21 | Cullin | 310—264 |
| 1,938,726 | 12/33 | Slauson | 317—170 |
| 2,354,704 | 8/44 | Ray | 317—170 |
| 2,594,915 | 4/52 | Guillemant | 336—83 |
| 2,628,342 | 2/53 | Taylor | 336—45 |
| 2,672,564 | 3/54 | Krasno | 310—46 |
| 2,775,742 | 12/56 | Bogue et al. | 336—83 |
| 2,786,983 | 3/57 | Hill | 336—83 |
| 2,812,454 | 11/57 | Buck | 310—46 |
| 2,867,894 | 1/59 | Hill | 29—155 |
| 2,882,505 | 4/59 | Feder | 336—96 |
| 2,906,978 | 9/59 | Mikesell | 336—192 |
| 2,915,723 | 12/59 | Wennerberg | 336—83 X |
| 2,918,640 | 12/59 | Higgs | 336—192 |
| 2,950,401 | 8/60 | Evans et al. | 310—44 |

FOREIGN PATENTS 214,780  5/24  Great Britain.

LARAMIE E. ASKIN, *Primary Examiner.*

MILTON O. HIRSHFIELD, JOHN F. BURNS, *Examiners.*